United States Patent [19]

Kumagai

[11] Patent Number: 4,796,722
[45] Date of Patent: Jan. 10, 1989

[54] DRIVE SHAFT APPARATUS FOR TRANSVERSE ENGINE VEHICLE

[75] Inventor: Tadanobu Kumagai, Okazaki, Japan

[73] Assignee: Toyota Jidosha Kabushiki Kaisha, Toyota, Japan

[21] Appl. No.: 8,322

[22] Filed: Jan. 29, 1987

[30] Foreign Application Priority Data

Feb. 21, 1986 [JP] Japan ............... 61-24910[U]

[51] Int. Cl.$^4$ ............................................. B60K 17/24
[52] U.S. Cl. ...................... 180/297; 180/75.2; 384/536; 384/541
[58] Field of Search ............... 180/297, 75.2; 384/536, 384/582, 540, 541

[56] References Cited

U.S. PATENT DOCUMENTS

| | | | |
|---|---|---|---|
| 1,174,543 | 3/1916 | Bried | 403/375 |
| 1,972,581 | 9/1934 | Barker | 384/536 |
| 2,271,336 | 1/1942 | Goldsmith | 384/541 |
| 3,104,123 | 9/1963 | Newkirk | 403/108 |
| 3,237,976 | 3/1966 | Campoli | 403/362 |
| 3,310,302 | 3/1967 | Catalfimo | 269/154 |
| 3,734,583 | 5/1973 | Hosnédl et al. | 384/541 X |
| 4,413,701 | 11/1983 | Kumagai | 180/297 X |
| 4,421,187 | 12/1983 | Shibata et al. | 180/297 X |

FOREIGN PATENT DOCUMENTS

| | | |
|---|---|---|
| 1790711 | 2/1954 | Fed. Rep. of Germany . |
| 1187662 | 9/1959 | France . |
| 57107626 | 12/1955 | Japan . |
| 54-144626 | 11/1979 | Japan ........... 180/297 |
| 779106 | 11/1980 | U.S.S.R. ........... 180/75.2 |

OTHER PUBLICATIONS

Antriebstechnik 14 (1975) Nr. 10, Seite 577 und 578.

*Primary Examiner*—David M. Mitchell
*Assistant Examiner*—Charles R. Watts
*Attorney, Agent, or Firm*—Oblon, Fisher, Spivak, McClelland & Maier

[57] ABSTRACT

A drive shaft apparatus for transverse engine vehicles including an opening portion formed in a bracket in the radial direction into which a pressing mechanism with an elastic body is fitted from the outside of the bracket, thereby pressing the outer peripheral surface of a bearing against the inner peripheral surface of a through hole which is formed in the bracket.

1 Claim, 7 Drawing Sheets

DRIVE SHAFT APPARATUS FOR TRANSVERSE ENGINE VEHICLE

BACKGROUND OF THE INVENTION

1. Field of the Invention

This invention relates to a drive shaft apparatus for transverse engine vehicles, more particularly to a drive shaft apparatus for a front engine and front wheel drive vehicle in which a differential unit is offset from the center of the vehicle to one side of a left or right wheel (in the transverse direction of the vehicle).

2. Description of the Prior Art

In general, in a front engine and front drive vehicle having a transverse engine, a differential unit is often disposed in a position shifted from the center of the longitudinal axis of the vehicle toward a left or right wheel, because a trans-axle which is integrally composed of a clutch, a transmission and the differential unit is ordinarily placed at one end of the engine block. If, in this arrangement, left and right wheels are directly connected by drive shafts to the differential unit, these left and right drive shafts differ from each other in length and in cathedral angles (joint angles). When a drive shaft having a cathedral angle rotates a moment which acts to pivotally and inwardly move the wheel about a king pin, namely, a force which acts to inwardly steer the wheel is caused by the driving torque in accordance with the degree of the cathedral angle when the vehicle abruptly starts, accelerates or climbs. For this reason, if left and right cathedral angles are not equal, moments which act on the left and right wheels such as described above differ from each other so that the vehicle tends to be steered toward the wheel on the side of the longer drive shaft. The drive performance to linearly moving the vehicle is thereby reduced.

In consideration of this problem, a type of drive shaft apparatus for transverse engine vehicles has been proposed (such as that disclosed in Japanese Utility Model Laid-Open No. 107626/1982) which employs an intermediate shaft to equalize the length of the left and right drive shafts, thereby preventing the effect of torque steer such as described above.

Figure 6:
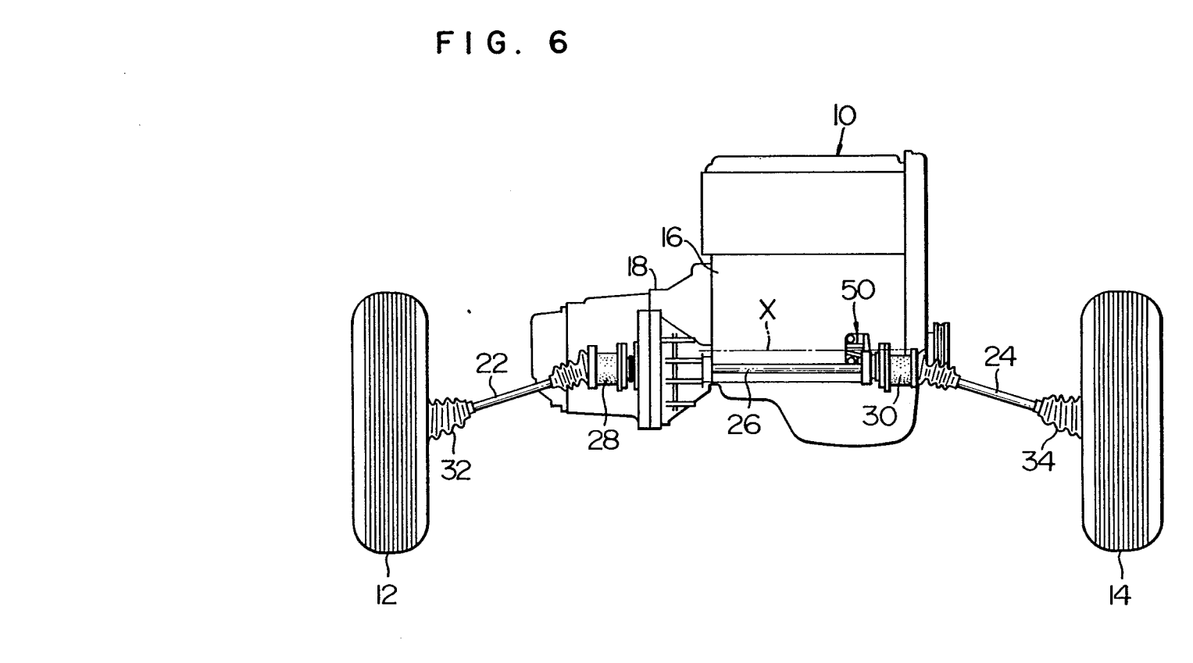
FIG. 6 is a schematic illustration of the entire construction of the conventional drive shaft apparatus for transverse engine vehicles as viewed from the rear of the vehicle.

More particularly in detail, as shown in FIG. 6, in a vehicle having a transverse engine 10 in which the center line X of the crank shaft extends in the transverse direction of the vehicle, the driving power is transmitted from a differential unit (not shown in the drawing) accommodated in a trans-axle case 18 mounted at one end of an engine block 16 to left and right wheels 12 and 14 through left and right drive shafts 22 and 24. Since this differential unit is mounted in a position largely shifted from the center axis of the vehicle in the transverse direction thereof, the drive shaft 22 which is disposed on the side where the distance between the wheel and the differential unit is smaller (on left hand side as viewed in FIG. 6) is directly connected to the differential unit in a conventional manner while the drive shaft 24 on the side where the distance between the wheel and the differential unit is larger (on the left hand side in FIG. 6) is connected through an intermediate shaft 26, thereby equalizing the length of the drive shafts 22 and 24. Incidentally, in FIG. 6, reference numerals 28 and 30 denote velocity joints disposed on the side of the differential unit, and reference numerals 32 and 34 denote velocity joints disposed on the sides of the wheels.

In the drive shaft apparatus thus arranged, the cathedral angles of the left and right drive shafts 22 and 24 are equalized so that equal moments act on left and right wheels 12 and 14, thereby eliminating the tendency to steer the vehicle.

Figure 7:
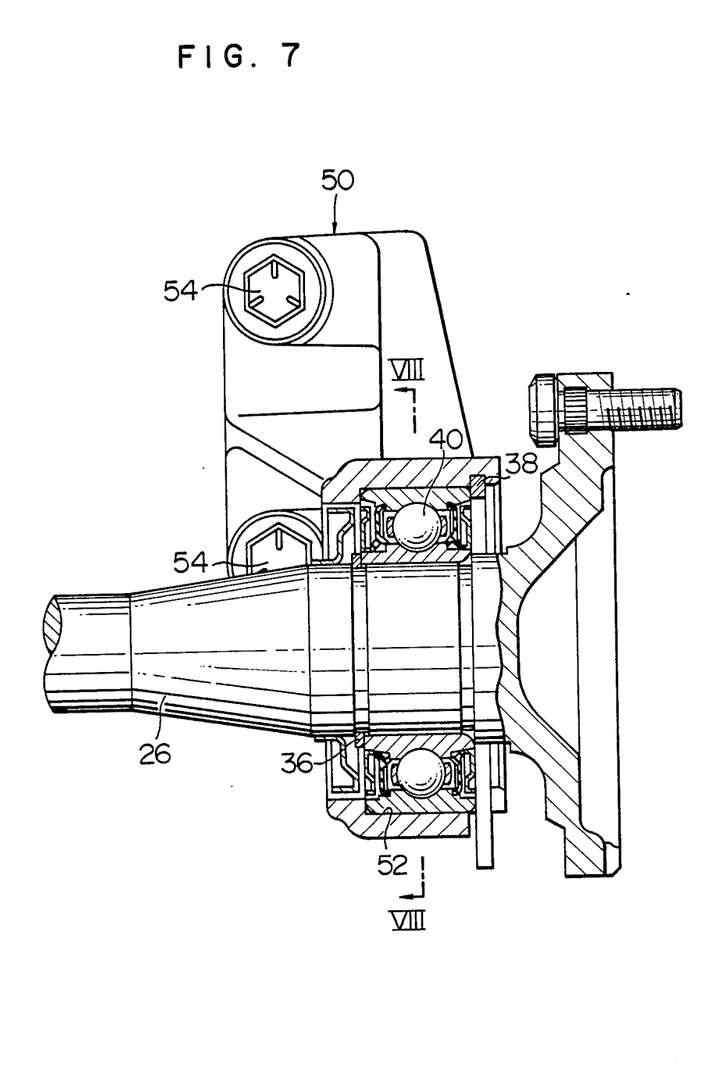
FIG. 7 is longitudinal sectional view of an essential part of the conventional apparatus corresponding to FIG. 2.
Figure 8:
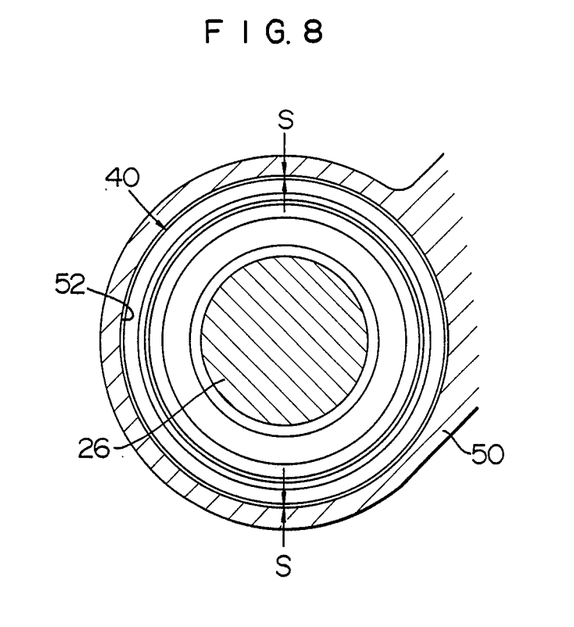
FIG. 8 is a cross-sectional view taken along a line VIII—VIII of FIG. 7.

In the arrangement of this type of apparatus, the intermediate shaft 26 is supported at its end portion, at which it is connected to the drive shaft 24, by a bearing 40 which is secured to a bracket 50 on an engine block 16, as shown in FIGS. 7 and 8. The intermediate shaft 26 is thus supported at its both ends thereof by the differential unit and the bearing 40, thereby increasing the apparatus stiffness (bearing stiffness).

The bearing 40 is previously forced along and set around the outer periphery of the intermediate shaft 26 and a snap ring 36 is applied thereto to prevent the bearing 40 from slipping off. A drive shaft assembly which is composed of the intermediate shaft 26, the velocity joint 30 disposed on the side of the differential unit, the drive shaft 24, and the velocity joint 34 disposed on the side of the wheel is mounted such that the top end of the intermediate shaft 26 is fitted into a side gear (not shown) of the differential unit while the bearing 40 is fitted into a through hole 52 of the bracket 50 which is secured to the engine block 16 by means of two bolts 54, a snap ring 38 being set in the bracket 50 to prevent the bearing 40 from being slipping off form the bracket.

However, in the drive shaft apparatus for transverse engine vehicles thus arranged, the bearing 40 and the through hole 52 are designed to be assembled in a loose-fit manner and a clearance 2S is provided between the bearing and the through hole for the purpose of facilitating the work of mounting the drive shaft assembly. That is, the size and weight of the drive shaft assembly which has the intermediate shaft 26, the velocity joint 30 disposed on the side of the differential unit, the drive shaft 24, and the velocity joint disposed on the side of the wheel is so large that the drive shaft assembly cannot easily be mounted while inserting the bearing 40 which is attached to the outer periphery of the intermediate shaft 26 into the through hole 52 of the bracket secured to the engine block 16 if the clearance 2S is not sufficient. It is thus necessary to set the clearance 2S more than a certain extent with a view to facilitating the assembling work and reducing the labor. The clearance 2S is exaggeratedly depicted in FIG. 8 so that it can be seen easily.

That is, there is a play between the inner surface of the through hole 52 of the bracket and the bearing 40 of the intermediate shaft. This play induces considerable rattling noise due to vibrations of the engine especially when the engine rotates in a medium speed range. Also there is a risk of creep wear or fretting wear of the bearing 40 caused by a whirling load or vibration of the intermediate shaft 26.

To prevent the problems due to the effect of the above-described fit clearance, the bearing may be forcibly inserted with a least clearance or, as disclosed in Japanese Utility Model Unexamined Laid-Open No. 107424/1985, a ring made of synthetic resin may be adapted. However, these methods inevitably result in the reduction of workability.

SUMMARY OF THE INVENTION

It is therefore an object of the present invention to eliminate the above-described fit clearance in the mounted state of the units and to solve the problems due to fit clearance without reducing the workability of the assembly work.

To this end the present invention provides a drive shaft apparatus for transverse engine vehicles which comprises an opening formed in the radial direction in a bracket secured to the engine block, and pressing means with an elastic body member fit into the opening, thereby pressing the outer peripheral surface of the bearing against the inner peripheral surface of a through hole of the bracket. By the effect of this arrangement in accordance with the present invention, it is possible to eliminate the problems of vibrations and noise or reduction in durability of the of the bearing due to play between the through hole of the bracket and the bearing while maintaining workability.

A more complete appreciation of the invention and many of the attendant advantages thereof will be readily obtained as the same becomes better understood by reference to the following detailed description when considered in connection with the accompanying drawings, wherein:

BRIEF DESCRIPTION OF THE DRAWINGS

FIGS. 1 to 3 show a drive shaft apparatus for transverse engine vehicles which represents a first embodiment of the present invention.

DESCRIPTION OF THE PREFERRED EMBODIMENTS

Preferred embodiments of the present invention will be described in detail with reference to the accompanying drawings.

Figure 1:
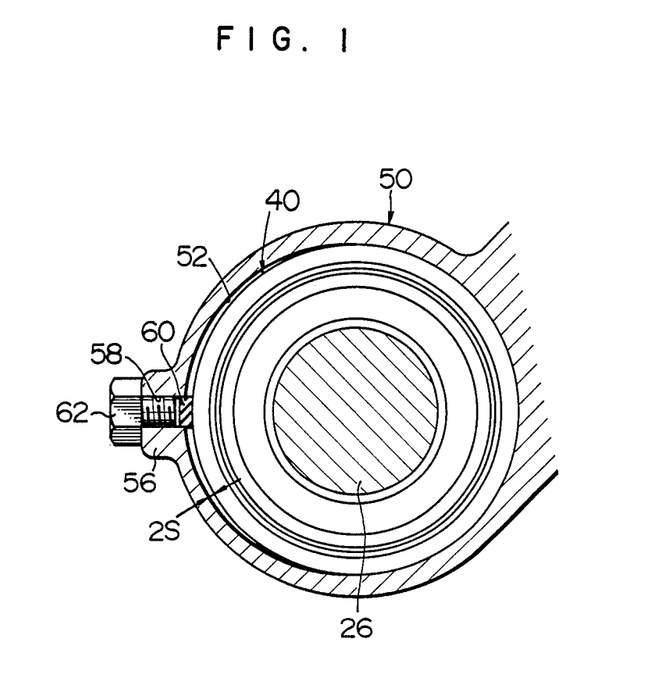
FIG. 1 is a partially sectional view of an essential part of the apparatus taken along a line perpendicular to the axis of an intermediate shaft (i.e. line I—I of FIG. 2)
Figure 2:
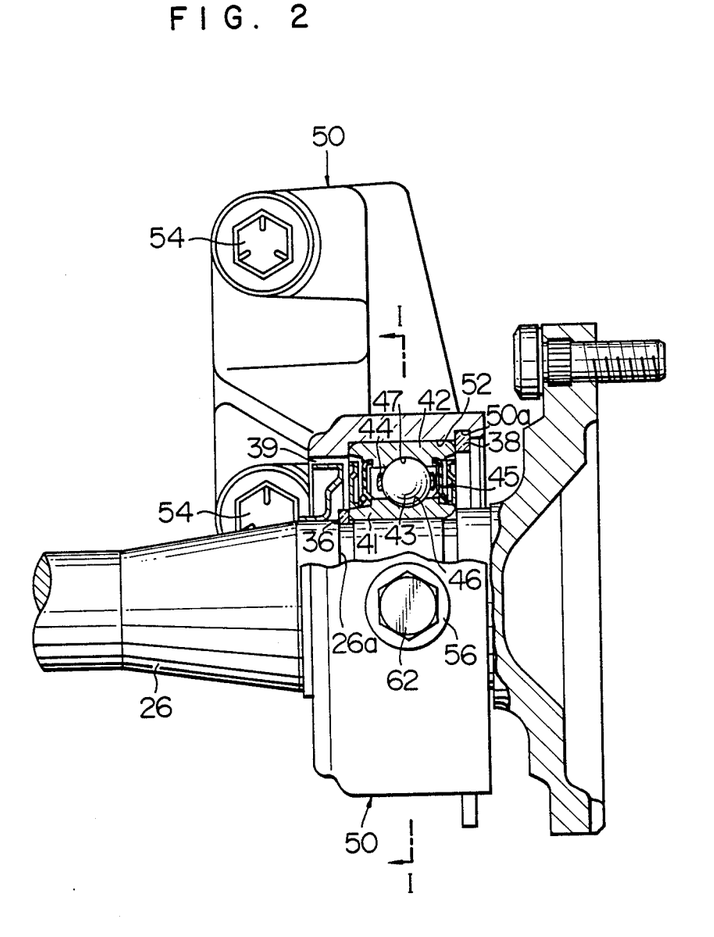
FIG. 2 is a cross-sectional view of the essential part taken along the axis of the intermediate shaft.
Figure 3:
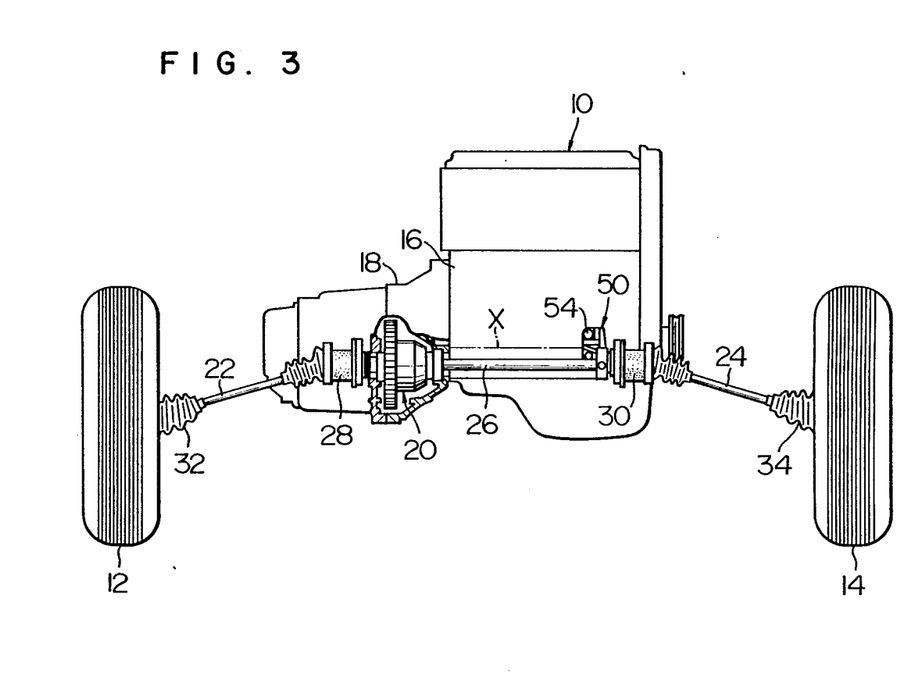
FIG. 3 is a schematic illustration of the entire construction as viewed from the rear of the vehicle.

In FIGS. 1 to 3 which show a drive shaft apparatus for transverse engine vehicles which is a first embodiment of the present invention, constituents which correspond to those of the above-described conventional apparatus are given the same reference numerals, and detailed description for them will not be repeated.

As shown in FIG. 3, a trans-axle case 18 is mounted at the left end of an engine block 16 of a transverse engine 10, and a differential unit 20 accommodated in the case 18 is offset to the side of a left wheel 12.

A left side gear (not shown) of the differential unit 20 is connected to the left wheel 12 through a velocity joint 28, left drive shaft 22 and a velocity joint 32, and a right side gear (not shown) of the differential unit 20 is connected to a right wheel 14 through an intermediate shaft 26, a velocity joint 30, a right drive shaft 24 and a velocity joint 34.

The intermediate shaft 26 is supported in the vicinity of its right end (in the vicinity of the velocity joint 30) by a bearing 40 which is described later. The bearing 40 is secured to a bracket 50 which is mounted on the engine block 16. The length of the intermediate shaft 26 is determined such that the distance between the center axis of the vehicle and the position of the right velocity joint 30 is set to be equal to the distance between the center axis and the position of the left velocity joint 28. The length of the left and right drive shafts 22 and 24 is thereby equalized, thus equalizing the cathedral angles (joint angles) of the left and right drive shafts.

The bearing 40 which is a deep groove radial ball bearing such as shown in FIG. 2 has an inner race 41, an outer race 42, a plurality of balls, a cage 44, and a seal element 45. The groove radius of a groove 46 for accommodating the balls formed in the inner race 41 is set to be about 0.52 times the diameter of the ball 43, and the groove radius of a groove 47 formed in the outer race 42 is set to be about 0.6 times the diameter of the ball 43, so that the inclination of the intermediate shaft 26 relative to the differential unit 20 due to the misalignment between the axes thereof can be tolerated. The bearing 40 is forced along and set around the outer periphery of the intermediate shaft 26 while the inner race 41 of the bearing 40 is in close contact with the shaft, and is prevented from slipping off by a snap ring 36 which is fitted into an annular groove 26a, thus being previously set around the intermediate shaft 26.

On the other hand, the bracket 50 is accurately positioned in the vertical direction and with respect to the inclination thereof after two knock pins embedded in the engine block 16 has been inserted into knock holes (not shown) of the bracket. The bracket 50 is previously secured to the engine block 16 by means of two bolts 54. A through hole 52 with stepped portions for fittingly supporting the bearing 40 is formed in the bracket 50, and an annular groove 50a into which the snap ring 38 is fitted is formed at the opening end portion of the through hole 52. The inside diameter of the through hole 52 is set to be larger than the outside diameter of the bearing 40 (the outside diameter of the outer race 42).

A dust cover 39 is attached to the outer periphery of the intermediate shaft 26 with a slight clearance between the outer peripheral surface of this cover and the inner peripheral surface of the narrower portion of the through hole 52 of the bracket.

In this embodiment, a boss portion 56 is formed in a predetermined position on the bracket 50 (on the lateral side as viewed in the drawings). The boss portion 56 has a threaded hole 58 which is provided as an opening in the radial direction. A bolt 62 provided as a pressing means which includes an elastic body member (elastic spacer) 60 in the form a cylinder made of, e.g., rubber or synthetic resin is screwed and fastened into the threaded hole 58 from the outside thereof.

The bolt 62 is fastened to compress and deform the elastic body member 60, so that the outer peripheral surface of the bearing 40, namely, the outer peripheral surface of the outer race 42 is pressed against the inner peripheral surface of the through hole 52 of the bracket. The dimensions of these parts are determined such that, when the bolt 62 is fastened, the fastening force of the bolt 62 is received by the bearing surface of the boss portion 56 while the restitutive force (reaction force) of the elastic body member 60 is applied as the pressing force to the outer race 42, thereby preventing an excessive force acting on the outer race 42 of the bearing 40 and also preventing the outer race 42 from being rotated relative to the bracket so that the outer race can be properly positioned.

In the drive shaft apparatus for transverse engine vehicles thus arranged, a drive shaft assembly composed of the intermediate shaft 26, the velocity joint 30 disposed on the side of the differential unit, the drive shaft 24, and the velocity joint disposed on the side of the wheel 34 is mounted such that the top end of the intermediate shaft 26 is fitted into the side gear (not shown) of the differential unit 26 while the bearing 40 which has been previously attached to the intermediate shaft 26 is fitted into the through hole 52 of the bracket 50 secured to the engine block 16, the snap ring 38 thereafter being set in the annular groove 50a of the bracket 50.

In this process of mounting the drive shaft assembly, the workability is the same as in the case of the conventional apparatus, since a clearance 2S which is the same as that in accordance with the conventional method is provided between the through hole 52 and the bearing 40 of the intermediate shaft 26.

The bolt 62 is thereafter screwed into the threaded hole 58 of the bracket 50 and is fastened together with the elastic body member 60. When the bolt 62 is fastened in this manner, the elastic body member 60 is compressed and deformed so that the outer peripheral surface of the bearing 40, namely, the outer peripheral surface of the outer race 42 is pressed against the inner peripheral surface of the through hole 52 of the bracket by the restitutive force (reaction force) of the elastic body member. As a result, in the mounted state of the assembly, a play which exists between the outer race 42 of the bearing attached to the intermediate shaft 26 and the through hole 52 of the bracket secured to the engine block 16 is eliminated.

Therefore, it is possible to prevent rattling noises caused by the play existing between the through hole 52 of the bracket and the bearing 40 attached to the intermediate shaft 26. Also, creep wear or fretting wear caused by a whirling load or vibration of the intermediate shaft 26 can be eliminated.

It is also possible to easily adjust the pressing force applied to the outer race 42 of the bearing 40 by suitably determining the thickness and hardness of the elastic body member 60 and the length of the bolt 62. Moreover, it is possible to eliminate the play between the through hole 52 of the bracket and the bearing 40 on the intermediate shaft 26 after the drive shaft assembly is mounted on the vehicle.

Only an additional work step in the process of manufacture necessitated by the present invention, that is, the step of forming the threaded hole 58 in the bracket 50, and the corresponding assembly step is to screw the bolt 62 into the threaded hole 58. The apparatus in accordance with the present invention is thus practical.

If the apparatus is arranged such that the top of a bolt 62 is directly pressed against the outer race 42 without the elastic body member 60 to close the clearance between the through hole 52 of the bracket and the bearing 40 on the intermediate shaft, there is a risk of applying excessive force to the outer race 42 and reducing the durability or lifetime of the bearing 40. Accordingly, the fastening force of the bolt 62 is set to be smaller in consideration of the lifetime of the bearing 40, so that the bolt 62 sometimes becomes loose and it is not possible to maintain the effect of limiting noise for a long period of time. Moreover, the control of the fastening force of the bolt 62 is so troublesome that it is not possible to adapt this arrangement for the mass production.

Figure 4:
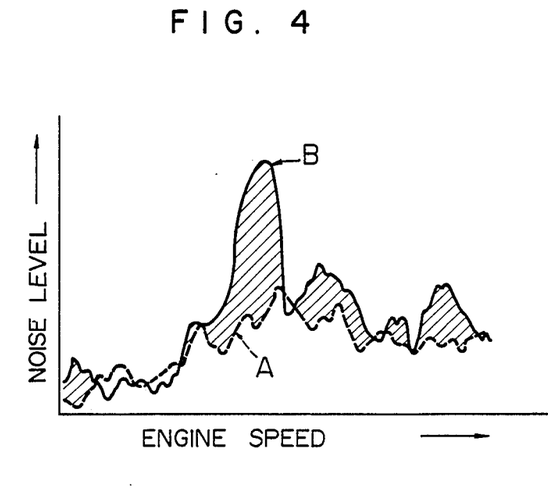
FIG. 4 is a graph of the compartment noise level measured when employing the apparatus in accordance with the present invention and a conventional apparatus.

FIG. 4 is a graph of the compartment noise level at a front seat and on the side of a window which was measured when the apparatus in accordance with the present invention and the conventional apparatus are employed.

As is clear from this graph in which the solid line represents the performance of the conventional apparatus and the broken line represents that of the apparatus of the present invention, the apparatus of the invention can greatly reduce the peak sound level (of a sixth harmonic component of the rotation of the engine at the time of deceleration). In FIG. 4, the hatched lines indicate the region in which the effect of reducing noise is observed.

Figure 5:
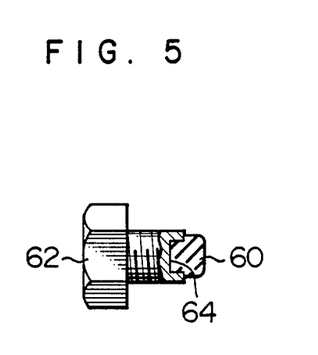
FIG. 5 is a partially sectional view of a bolt used in a drive shaft apparatus for transverse engine vehicle with represents a second embodiment of the present invention.

FIG. 5 shows a bolt which is used in a drive shaft apparatus for transverse engine vehicles provided as a second embodiment of the present invention.

In this embodiment, a recessed portion 64 is formed at the end of the bolt 62 into which an elastic body 60 such as rubber is fitted and bonded, thereby forming one integral member.

Figure 9:
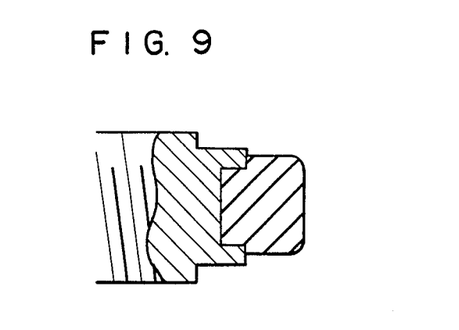
FIG. 9 is a partially sectional enlarged view of a bolt which makes a step on the screw portion of the bolt of FIG. 5.

This embodiment is more effective than that the first embodiment in terms of workability. On another occasion it is able to make a step on the screw portion as shown in FIG. 9.

As described above by way of an example with reference to FIGS. 1 to 3, the apparatus in accordance with the present invention for a vehicle having the transverse engine 10 is provided with the left and right drive shafts 22 and 24 which have the same length and which are respectively connected at their ends to the left and right wheels 12 and 14 through the velocity joints 32 and 34. The drive shaft 22 is connected at the other end through the velocity joint 28 to one of the output sides of the differential unit 20 which is offset from the center of the vehicle in the transverse direction, and the other drive shaft 24 is connected at the other end through the velocity joint 30 to one end of the intermediate shaft 26 which is connected at its other end to the other output side of the differential unit 20.

The intermediate shaft 26 with bearing 40 attached to an intermediate portion of the intermediate shaft 26 is fittingly inserted into the through hole 52 of the bracket 50 which is secured to the engine block 16, thereby being supported on the engine block 16.

Furthermore, the bracket 50 has the radial opening 58 into which the pressing means 62 including the elastic body 60 is fitted from the outside, thereby pressing the outer peripheral surface of the bearing 40 against the inner peripheral surface of the through hole 52 of the bracket.

This arrangement provides the predetermined clearance 2S between the through hole 52 of the bracket 50 secured to the engine block 16 and the bearing 40 attached to the intermediate shaft 26 before the drive shaft assembly is mounted on the engine block.

Thus, the work of mounting the drive shaft assembly on the vehicle, namely, the work of fitting the top of the intermediate shaft 26 into the differential unit and fitting the bearing 40 into the through hole 52 of the bracket can be effected easily as in the case of the conventional apparatus.

Moreover, when the bolt 62 is screwed and fastened into the threaded hole 58 of the bracket 50 together with the elastic body 60 after the drive shaft assembly has been mounted, the outer peripheral surface of the bearing 40 is pressed against the inner peripheral surface of the through hole 52 of the bracket, thereby closing the clearance therebetween.

Accordingly, the effect of vibrations and rattling noise due to the above-described fit clearance such as observed with respect to the conventional drive shaft apparatus for transverse engine vehicles especially in the medium speed range of the engine can be minimized.

The present invention has been described with respect to the specific embodiments, but the present invention is not limited to these. Other modifications and alterations can be made so long as they are not departed from the scope of the invention which is set forth in the attached claims. For example, the positions of the bolt and the threaded hole of the bracket can be changed as desired from the lateral position to a more suitable position for improving workability. An elongated rectangular opening may be formed in the bracket in the peripheral direction into which a curved rectangular elastic body is inserted and which is closed by a cover on the outside, thereby pressing the outer race over a wide area. In addition, the present invention may be applied to a type of drive shaft apparatus for transverse engine vehicles in which the end of an intermediate shaft is connected to the output shaft of a differential unit by means of a fixing joint or spline joint.

What is claimed is:

1. A drive shaft apparatus for a transverse engine vehicle having an intermediate shaft, a bracket secured to an engine block and having a through hole formed therein, first and second drive shafts equal in length and respectively connected at respective first ends thereof to first and second wheels through first and second velocity joints, the first of said drive shafts being connected at a second end thereof through a third velocity joint to a first output side of a differential unit offset from the center of said vehicle in the transverse direction thereof, the second of said drive shafts being connected at a second end thereof through a fourth velocity joint to a first end of said intermediate shaft which is connected at a second end thereof to a second output side of said differential unit, a bearing attached to an intermediate portion of said intermediate shaft and inserted into said through hole formed in said bracket secured to said engine block, said drive shaft apparatus comprising an opening portion formed in said bracket in the radial direction thereof, said pressing means having an elastic body, said pressing means being fitted into said opening portion from the outside thereof for pressing the outer peripheral surface of said bearing against the inner peripheral surface of said through hole and for preventing an excessive force acting on an outer race portion of the bearing and for preventing said outer race portion from being rotated relative to the bracket so that said outer race portion can be properly positioned wherein said opening portion comprises a single opening portion having a threaded hole and said pressing means comprises a single elastic body and a single bolt such that play exists between an inner surface of said through hole of said bracket and said bearing.

* * * * *